W. H. WILKINS.
RESILIENT WHEEL.
APPLICATION FILED APR. 24, 1917.
1,244,934.
Patented Oct. 30, 1917.
2 SHEETS—SHEET 1.
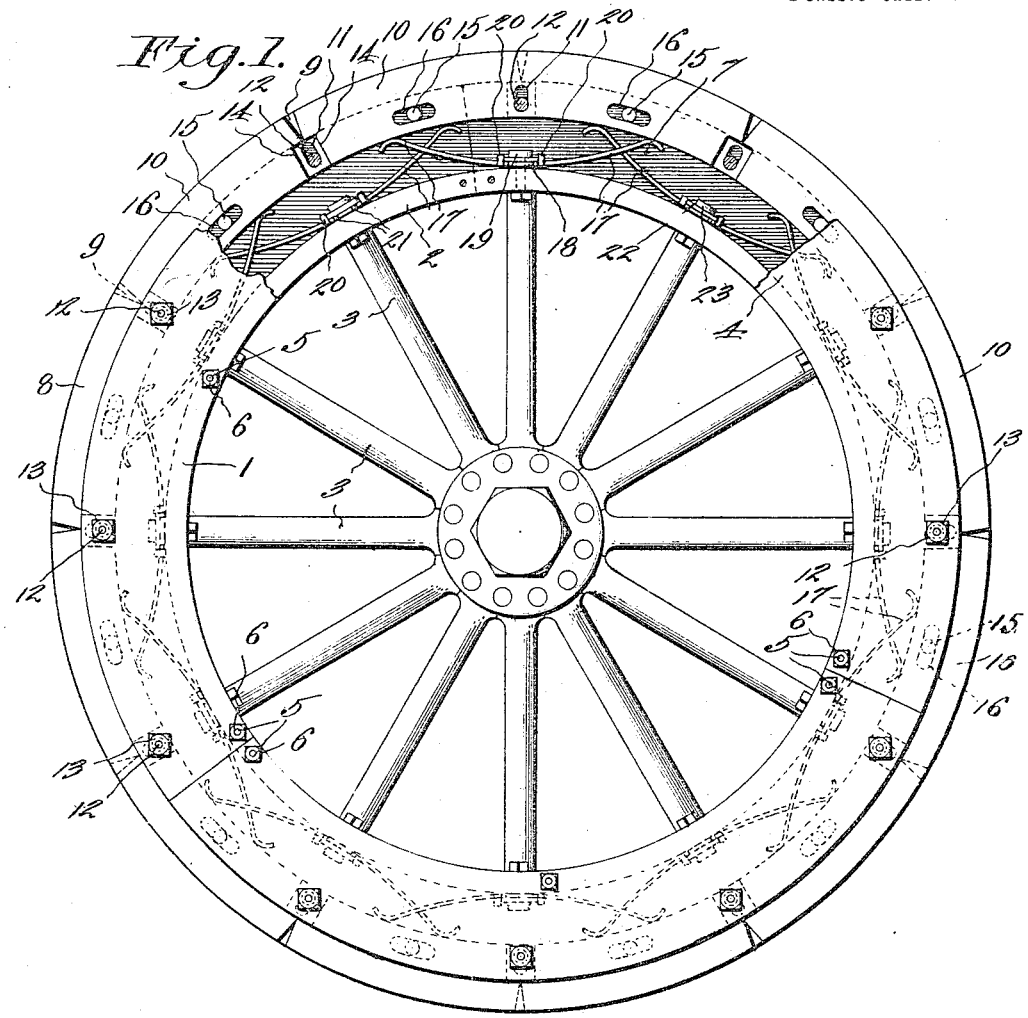
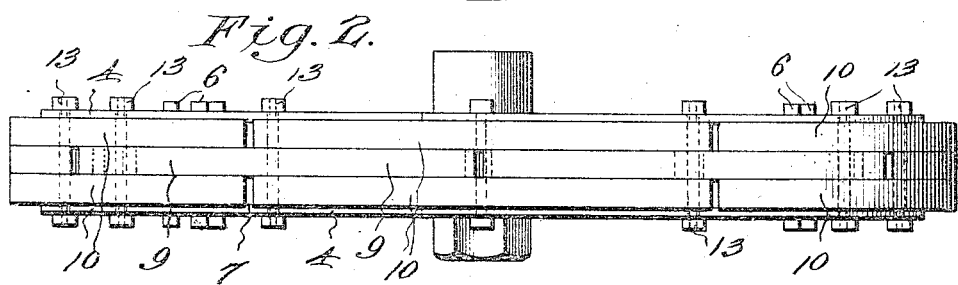
WITNESSES
INVENTOR
W. H. Wilkins,
BY Victor J. Evans
ATTORNEY

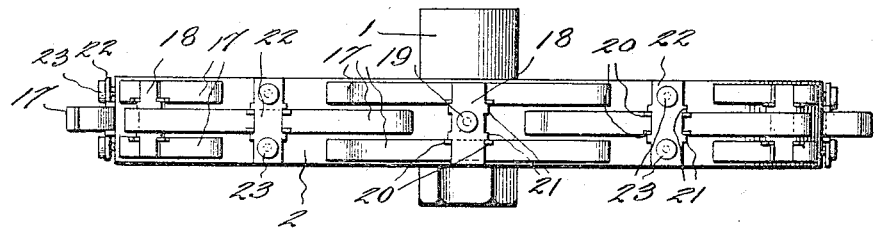

UNITED STATES PATENT OFFICE.

WILLIAM H. WILKINS, OF NEWARK, NEW JERSEY.

RESILIENT WHEEL.

1,244,934.   Specification of Letters Patent.   Patented Oct. 30, 1917.

Application filed April 24, 1917. Serial No. 164,191.

*To all whom it may concern:*

Be it known that I, WILLIAM H. WILKINS, a citizen of the United States, residing at Newark, in the county of Essex and State of New Jersey, have invented new and useful Improvements in Resilient Wheels, of which the following is a specification.

My invention relates to resilient wheels for vehicles of various kinds and has for its primary object to provide a resilient wheel of simple construction and which is well adapted to perform its functions.

A further object of my invention is to provide a resilient wheel, the tire or road contacting rim of which is made up of a series of rings composed of segments, the segments of each ring overlapping the segments of the adjacent ring whereby the road is always contacted by at least one segment at a point intermediate the ends thereof. The construction does away with the vibration which is inherent in most resilient wheels which is caused by the various segments contacting the road as the prior road contacting segment breaks contact with the same.

A still further object of my invention is to provide a resilient wheel, the tire or road contacting rim thereof being formed of a series of rings composed of segments, and a spring means for retaining the segments in extended position which is compact in form and efficient in operation.

With these and other objects in view which will be hereinafter fully described and particularly pointed out in the claims, the invention consists in the novel construction and arrangement of parts illustrated in the accompanying drawings forming a part of this specification, in which:—

Figure 1 is a side elevation of a wheel embodying my invention, parts thereof being broken away to show the structure thereof, Fig. 2 is a partial top plan view of the wheel, Fig. 3 is a top plan view of the corresponding portion of the wheel rim, Fig. 4 is a side elevation of one of the segments which compose the inner ring of the tire or rim, and Fig. 5 is a top plan view of the same.

Fig. 6 is a side elevation of one of the segments which compose the outer rings of the tire or rim.

Like characters of reference indicate like parts in the various views.

In the drawings 1 indicates a vehicle wheel having a felly 2 mounted on the spokes 3 thereof. Side plates 4 are clamped upon the opposite sides of the felly by means of a series of headed bolts 5 engaging corresponding holes in the plates and the felly and having nuts 6 screw threaded thereon clamping the side plates and the felly between them and the heads of the bolts. The side plates extend outwardly from the felly of the wheel and form a channel 7 about the circumference thereof.

The tire or rim of the wheel is designated generally by the reference character 8. Said tire 8 is composed of a plurality of segments 9 and 10 forming a plurality of rings. In the preferred embodiment of my invention the tire is composed of three rings, the segments 9 forming the center ring, and the segments 10 forming the outer rings. In the preferred embodiment of my invention each ring is made up of six segments, and the ends of each segment are disposed at a point intermediate the ends of the adjacent segments of the other rings. Each segment is provided at its center with a radially disposed slot 11, and a series of bolts 12 are mounted on the side plates 4 and extend across the channel formed thereby and engage respective slots 11 of the segments. The bolts 12 are secured upon the side plates 4 by means of shouldered ends thereof engaging holes in said side plates, nuts 13 being screw threaded upon the ends of said bolts and clamping said side plates between them and said shoulders. The bolts 12 are disposed concentrically with the axis of the wheel and by their engagement with respective slots 11 limit the radial movement of the segments. The ends of each segment do not abut the ends of the adjacent segments and a small space is left therebetween so that each segment may move freely independently of its adjacent segments. The inner portion of the end of each segment is cut out, as designated at 14, to accommodate respective bolts 12, which, it will be noted, are positioned at each end of the segments. Each of the segments 9, which compose the center ring, is provided with a pair of transversely extending pins 15, located at a point intermediate the center of the segment and the respective end thereof. The pins 15 are secured upon the segments and extend outwardly upon each side thereof, and engage tangential slots 16 formed in the outer segments 10 at points intermediate the center of the segment and the respective ends thereof.

A semi-elliptic spring 17 is provided for each segment and lies in the respective plane thereof between the outer surface of the felly 2 and the inner surface of its respective segment, and is secured at its center to the outer surface of the felly in the following manner: It will be noted in this regard that the segments 10 of the outer rings lie in the same transverse plane respecting the wheel. As a result their respective springs also lie in the same transverse plane respecting the wheel, and a common securing means is provided for each pair of springs which engage each respective pair of segments 10. This securing means constitutes a cross plate 18, secured to the felly of the wheel by means of a center stud 19, said stud being headed and passing through holes in the cross plate and the felly and having a nut screw threaded upon its inner end to clamp the cross plate and the felly between it and the head of the screw. And the ends of the cross plates engage the center portions of the respective springs 17 and clamp the same upon the outer surface of the felly. All the springs 17 are provided with upturned projections 20 engaging the edges of their respective cross plates to position the same longitudinally respecting said cross plates. All the cross plates are provided with down-turned projections 21 which position the springs transversely. The springs 17 which engage the segments 9 of the center ring are secured by means of cross plates 22 which are secured upon the outer surface of the felly by means of two screws 23 engaging respective holes at the ends of the plates and holes in the felly, and having nuts screw threaded upon their inner ends to clamp the felly and the cross plates together. The springs 17 which are engaged by said cross plates 22 are positioned at the center of said cross plate by means of up-turned projections 20 formed on said springs and down-turned projections 21 formed on said cross plates as above described.

In the operation of the device the springs 17 normally hold the segments 9 and 10 in extended position, the radial slots 11 engaging the bolts 12 with their lower ends. When an obstruction is encountered the segments which contact the obstruction are depressed inwardly against the influence of the springs. Through the medium of the pins 15 and their engagement with respective tangentially disposed slots 16 each segment coacts with its adjacent segments to cushion the shock, the springs of one ring of segments coacting through their respective segments and said pins and slots to resist strains exerted upon the adjacent segments of the other rings. The outer ends of the radial slots 11 and the outer ends of the cut out portions 14 serve to limit the inward movement of the segments relative to the wheel, and it will be noted that each segment has three such engagements with said bolts 12 to limit the inward movement thereof whereby the segments are prevented from tipping too far and injuring their respective springs thereby.

By reason of the fact that the segments of each ring overlap the segments of the adjacent rings and that said segments may move relative to each other a rim of great flexibility is obtained, and the action thereof is closely analogous to the action of a pneumatic rubber tire.

Having thus fully described my invention, I claim:—

1. In a device of the character described, the combination with a wheel having a channel formed about the circumference thereof, of a plurality of segments forming a plurality of rings engaging said channel, a series of bolts secured to said wheel, each engaging a radial slot formed in a segment of one of said rings, a series of pins secured on respective segments of one ring and engaging tangential slots formed in the segments of the other rings, and spring means secured on said wheel and engaging said segments to normally position the same in extended position.

2. In a device of the character described, the combination with a wheel having a channel formed about the circumference thereof, of a plurality of segments forming a plurality of rings engaging said channel, a series of bolts secured to said wheel, each engaging a radial slot formed in a segment, a series of pins secured on respective segments of one of said rings and engaging tangential slots formed in the segments of the other rings, and spring means secured on said wheel and engaging said segments to normally position the same in extended position.

3. In a device of the character described, the combination with a wheel having a channel formed about the circumference thereof, of a plurality of segments forming a plurality of rings engaging said channel, a series of bolts secured to said wheel, each engaging a radial slot formed in a segment of one of said rings, a series of pins secured on respective segments of the same ring, each engaging tangential slots formed in the segments of the other rings, and a series of semi-elliptic springs secured to said wheel in a staggered order and having the outer ends thereof engaging respective segments of said rings.

4. In a device of the character described, the combination with a wheel having a channel formed about the circumference thereof, of a plurality of segments forming a plurality of rings engaging said channel, a series of bolts secured to said wheel and engaging radial slots formed in the segments of said rings, a series of pins secured on respective segments of one of said rings, each engaging tangential slots formed in segments of the other rings, and a series of semi-elliptic springs secured to said wheel in a staggered order and having the outer ends thereof engaging respective segments of said rings.

5. In a device of the character described, the combination with a wheel having a channel formed about the circumference thereof, of a plurality of segments forming a plurality of rings engaging said channel, a series of bolts secured to said wheel, each engaging a radial slot formed in a segment of one of said rings, a series of pins secured on respective segments of the same ring, each engaging tangential slots formed in the segments of the other rings, and a semi-elliptic spring for each segment having its center secured on said wheel in line with the center of its respective segment and having its ends engaging said respective segment at points adjacent the ends thereof.

6. In a device of the character described, the combination with a wheel having a channel formed about the circumference thereof, of a plurality of segments forming a plurality of rings engaging said channel, a series of bolts secured to said wheel and engaging radial slots formed in the segments of said rings, a series of pins secured on respective segments of one of said rings, each engaging tangential slots formed in the segments of the other rings, and a semi-elliptic spring for each segment having its center secured on said wheel in line with the center of its respective segment and having its ends engaging said respective segment at points adjacent the ends thereof.

In testimony whereof I affix my signature.

WILLIAM H. WILKINS.

Copies of this patent may be obtained for five cents each, by addressing the "Commissioner of Patents, Washington, D. C."